US009519784B2

(12) United States Patent
Graham

(10) Patent No.: US 9,519,784 B2
(45) Date of Patent: Dec. 13, 2016

(54) MANAGING BASIC INPUT/OUTPUT SYSTEM (BIOS) ACCESS

(75) Inventor: Christoph J Graham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 14/347,530

(22) PCT Filed: Sep. 30, 2011

(86) PCT No.: PCT/US2011/054237
§ 371 (c)(1),
(2), (4) Date: Mar. 26, 2014

(87) PCT Pub. No.: WO2013/048439
PCT Pub. Date: Apr. 4, 2013

(65) Prior Publication Data
US 2014/0230078 A1     Aug. 14, 2014

(51) Int. Cl.
*G06F 21/57* (2013.01)
*G06F 21/60* (2013.01)
*G06F 21/31* (2013.01)
*G06F 21/62* (2013.01)

(52) U.S. Cl.
CPC ............ *G06F 21/572* (2013.01); *G06F 21/31* (2013.01); *G06F 21/60* (2013.01); *G06F 21/6209* (2013.01); *G06F 2221/2115* (2013.01)

(58) Field of Classification Search
CPC .... G06F 21/572; G06F 21/6209; G06F 21/31; G06F 21/60; G06F 2221/2115
See application file for complete search history.

(56) References Cited

U.S. PATENT DOCUMENTS

| 5,884,073 | A | 3/1999 | Dent |
| 6,148,387 | A | 11/2000 | Galasso et al. |
| 6,353,885 | B1* | 3/2002 | Herzi ................... G06F 9/4411 713/1 |
| 6,801,946 | B1 | 10/2004 | Child et al. |
| 7,185,359 | B2 | 2/2007 | Schmidt et al. |
| 7,203,831 | B2 | 4/2007 | Wu et al. |
| 7,370,190 | B2 | 5/2008 | Calhoon et al. |
| 7,979,899 | B2 | 7/2011 | Guo et al. |
| 2006/0184794 | A1* | 8/2006 | Desselle ............... G06F 21/575 713/166 |
| 2007/0245142 | A1* | 10/2007 | Rios ..................... G06F 21/572 713/168 |

(Continued)

FOREIGN PATENT DOCUMENTS

CN     102024099     4/2011

OTHER PUBLICATIONS

Hewlett-Packard Development Company, L.P., "HP and Broadcom DASH Tutorial," Sep. 6, 2011, (video and voice-over excerpts), 18 pages, http://h20621.www2.hp.com/video-gallery/us/en/c453f20f20285dee4ff3e4b60e0009264a3b3e17/r/video>.

(Continued)

*Primary Examiner* — Matthew Smithers
(74) *Attorney, Agent, or Firm* — HP Inc Patent Department

(57) ABSTRACT

Example embodiments disclosed herein relate to managing basic input/output system (BIOS) access. Example embodiments include communicating with a remote directory server in response to an attempt to access a setting of a BIOS module.

20 Claims, 5 Drawing Sheets

(56) References Cited

U.S. PATENT DOCUMENTS

| | | | |
|---|---|---|---|
| 2008/0022367 A1 | 1/2008 | Dailey et al. | |
| 2008/0148031 A1* | 6/2008 | Brown | G06F 9/44505 713/1 |
| 2008/0229396 A1 | 9/2008 | Bodepudi et al. | |
| 2009/0327503 A1 | 12/2009 | Hochmuth et al. | |
| 2010/0121882 A1 | 5/2010 | Barrett et al. | |
| 2010/0169640 A1 | 7/2010 | Smith et al. | |
| 2010/0169669 A1 | 7/2010 | Smith | |
| 2011/0154009 A1* | 6/2011 | Harmer | G06F 9/4401 713/2 |
| 2013/0019281 A1* | 1/2013 | Jacobs | G06F 21/575 726/4 |

OTHER PUBLICATIONS

Farlex, Inc., "BIOS," Aug. 2011, TheFreeDictionary, (web page), <www.thefreedictionary.com>. 6 pages (copy pulled on Oct. 6, 2015).
Charles M. Kozierok, "IP Datagram Encapsulation," The TCP/IP Guide, Sep. 20, 2005, <http://www.tcpipguide.com/free/t_IPDatagramEncapsulation.htm>.
Distributed Management Task Force, Inc., "DASH Implementation Requirements," Jun. 22, 2009, DSP0232, Ver. 1,1.0.
Distributed Management Task Force, Inc., "Systems Management Architecture for Mobile and Desktop Hardware," White Paper, Dec. 2007, DSP2014, Ver. 1.1.0.
Gracion Software, "What is LDAP?," Aug. 26, 2011, <http://web.archive.org/web/20110826095752/http://www.gracion.com/server/whatldap.html>.
Infopeople, "Protecting the BIOS," (web page), available Sep. 29, 2011.
Wikipedia, "Active Directory," Aug. 31, 2011, <http://en.wikipedia.org/w/index.php?title=Active_Directory&oldid=447605617>.
Wikipedia, "BIOS," Aug. 31, 2011, <http://en.wikipedia.org/w/index.php?title=BIOS&oldid=447595163>.
Wikipedia, "Computing Platform," Jul. 30, 2011, <http://en.wikipedia.org/w/index.php?title=Computing_platform&oldid=442274778>.
Wikipedia, "Hypervisor," Aug. 20, 2011, <http://en.wikipedia.org/w/index.php?title=Hypervisor&oldid=445895262>.
Wikipedia "Intel Active Management Technology," Jul. 20, 2011, <http://en.wikipedia.org/w/index.php?title=Intel_Active_Management_Technology&oldid=440499187>.
Wikipedia, "Intelligent Platform Management Interface," Jul. 6, 2011, <http://en.wikipedia.org/w/index.php?title=Intelligent_Platform_Management_Interface&oldid=438026176>.
Wikipedia, "Internet protocol suite," Jul. 26, 2011, <http://en.wikipedia.org/w/index.php?title=Internet_protocol_suite&oldid=441534016>.
Wikipedia, "Kerberos (protocol)," Aug. 26, 2011, <http://en.wikipedia.org/w/index,php?title=Kerberos_(protocol)&oldid=446899354>.
Wikipedia, "Lightweight Directory Access Protocol," Aug. 23, 2011, <http://en.wikipedia.org/w/index.php?title=Lightweight_Directory_Access_Protocol&oldid=446382250>.
Wikipedia, "Southbridge (computing)," Aug. 24, 2011, <http://en.wikipedia.org/w/index.php?title=Southbridge_(computing)&oldid=446483484>.
International Search Report & Written Opinion received for PCT Application No. PCT/US2011/054237, May 7, 2012, 9 pages.

* cited by examiner

MANAGING BASIC INPUT/OUTPUT SYSTEM (BIOS) ACCESS

BACKGROUND

A computing device such as a desktop computer, notebook computer, tablet computer, mobile phone, or smart device may store a number of alterable settings that affect the configuration of the computing device. Some such settings may be stored in the basic input/output system (BIOS) of the computing device. Settings stored in the BIOS may include, for example, settings affecting the operation of hardware devices of the computing device, settings affecting the boot order of the computing device, and the like.

BRIEF DESCRIPTION OF THE DRAWINGS

The following detailed description references the drawings, wherein.

DETAILED DESCRIPTION

Figure 1:
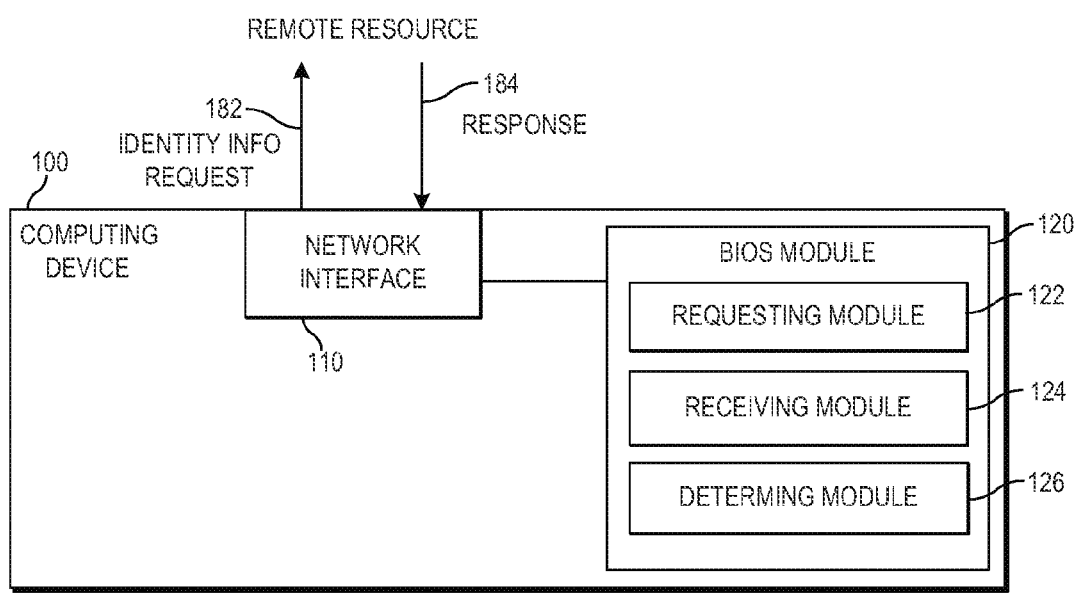
FIG. 1 is a block diagram of an example computing device for managing basic input/output system (BIOS) access.

As noted above, some settings for a computing device may be stored in a basic input/output system (BIOS) of the computing device. In some situations, such as in a company or other enterprise, it may be beneficial to restrict access to the BIOS settings of the enterprise's computing devices such that only some users (e.g., technology administrators) may alter BIOS settings of the computing devices. To this end, each of the enterprise's computing devices may be configured to grant access to BIOS settings after entry of a password matching a password stored on the computing device. However, using locally stored passwords to restrict access to BIOS settings in this manner may complicate the administration of a plurality of computing devices of an enterprise by a group of administrators. For example, if each of the computing devices has a different password, then each administrator must store the password for each computing device. Alternatively, each computing device in the enterprise may have the same password. However, this alternative may weaken security, as discovery of the password by a non-administrator may grant access to settings for each computing device. Additionally, changing that password would require a change on each individual computing device.

To address these issues, examples disclosed herein provide tools for managing the settings stored in a BIOS module of a computing device using information stored in a remote directory. In some examples disclosed herein, a BIOS module of a computing device may request information associated with at least one user credential from a remote directory server in response to receiving a request to access a setting of the BIOS module. In such examples, the BIOS module may determine whether to grant access to the BIOS setting based on information received from the remote directory server. For example, in response to receiving a request to access a setting stored in a BIOS module, the BIOS module may communicate with a remote directory server to validate a user's credentials based on credentials stored in the remote directory server and/or determine from information stored in the remote directory server whether the user has permission to access the setting.

In this manner, each user's credential information may be managed on the remote directory server instead of individually on each computing device of an enterprise. Accordingly, examples disclosed herein may simplify the process of granting or revoking user (e.g., administrator) access to BIOS settings for a large number of computing devices, and simplify the process of changing user credential information. Examples disclosed herein may also simplify the process of providing different users with different levels of access to BIOS settings. For example, examples disclosed herein may enable management of user access to BIOS settings based on a user's group memberships within an enterprise. In some examples, a directory server for an enterprise may store information associated with users within the enterprise (e.g., employees of a company), including users' group memberships (e.g., business unit membership, etc.) and/or roles within the enterprise. Examples disclosed herein may control BIOS setting access based at least in part on a user's group memberships, which may allow a user's permissions to be correlated with the user's roles and group memberships (e.g., in a technology administrator group) in the enterprise.

Referring now to the drawings, FIG. 1 is a block diagram of an example computing device 100 for managing basic input/output system (BIOS) access. As used herein, a "computing device" is a desktop computer, a notebook computer, a slate or tablet computer, a mobile phone, a smart device (e.g., a smartphone), a server, or any other device capable of using a network interface to communicate with a remote device via a communications network. In some examples, computing device 100 may be any of the computing devices noted above. In the example of FIG. 1, computing device 100 includes a network interface 110, and a BIOS module 120 including modules 122, 124, and 126.

As used herein, a "network interface" is at least one hardware component that may be used by a computing device to communicate with at least one remote resource of a communications network including at least one computer network, at least one telephone network, or a combination thereof. In some examples, suitable computer networks include, for example, a local area network (LAN), a wireless local area network (WLAN), a wide area network (WAN), an enterprise private network, a virtual private network (VPN), the Internet, and the like. Suitable telephone networks include, for example, a wired telephone network, a wireless telephone network (e.g., a cellular network), a mobile broadband network, and the like.

As used herein, a "BIOS module" is a module including a series of instructions encoded on a machine-readable storage medium for implementing at least basic input/output system (BIOS) functionalities for a computing device, and which implements its functionalities independent of the operation of any operating system (OS) by the computing device. In examples described herein, a BIOS module may also include least one module to perform additional functionality. In such examples, the functionality of the modules included in the BIOS module may be implemented as a series of instructions encoded on a machine-readable storage medium of a computing device and executable by a processor of the computing device. In such examples, these instructions, along with BIOS settings and instructions implementing BIOS functionalities, may be stored in a non-volatile storage area of the computing device. In other examples, the BIOS module may comprise at least one hardware device including electronic circuitry for at least partially implementing the functionality of the modules included in the BIOS module.

Additionally, as used herein, a "setting" of a BIOS module (which may be referred to herein as a "BIOS setting") is any setting stored in the BIOS module that affects the configuration of a computing device including the BIOS module. Various BIOS settings may specify, for example, the boot sequence of the computing device, whether certain hardware devices (e.g., a network interface, etc.) are enabled, certain hardware device operating characteristics (e.g., the speed of a hard disk drive), whether certain ports are enabled (e.g., universal serial bus (USB) ports, other media card slots, etc.), computing device security settings (e.g., various passwords), power settings, and the like.

In the example of FIG. 1, requesting module 122 may receive a request to access a setting of BIOS module 120. As used herein, a "request to access" a setting of a BIOS module is a request to overwrite or otherwise alter at least one BIOS setting stored in a BIOS module, or to request entry to an interface through which at least one BIOS setting stored in a BIOS module may be altered. For example, a request to access a setting of a BIOS module may be a request to change a specified BIOS setting to a particular value. In other examples, a request to access a setting of a BIOS module may be a request, received from an input device (e.g., a keyboard, etc.) of a computing device, to enter a process of the BIOS module through which a user may alter at least one setting of the BIOS module of the computing device manually using an input device of the computing device.

In some examples, module 122 may request, from a remote resource, identity information associated with a user credential in response to at least receiving the access request. The remote resource may be, for example, a remote directory server. As used herein, a "credential" is any type of information that may be used to confirm the identity of an entity supplying the credential including, for example, at least one of a username, a password, a digital credential (e.g., a digital certificate, digital key, digital badge, etc.), and the like. In some examples, the user credential may be received as part of the access request. In other examples, the user credential may be retrieved (e.g., from a user) in response to the access request.

In some examples, module 122 may request identity information associated with the user credential from the remote resource with network interface 110. For example, in response to at least receiving a request to access a setting of BIOS module 120, module 122 may provide, with network interface 110, a request 182 for identity information associated with the user credential to a remote resource via a communications network. As used herein, "identity information" means information including at least one of credential validation information and permission information associated with a user credential. Moreover, as used herein, "credential validation information" is information indicating whether at least one user credential (e.g., a username and password combination) provided to a remote resource matches at least one user credential (e.g., a username and password combination) stored in the remote resource. Additionally, as used herein, "permission information" is information from which a BIOS module may determine whether a user associated with at least one user credential has permission to access a setting of the BIOS module in accordance with an access request.

In the example of FIG. 1, network interface 110 may receive a response 184 from the remote resource to the request 182 for identity information. In such examples, response 184 may include the identity information requested via request 182. In some examples, receiving module 124 may receive, from network interface 110, access information based on the identity information included in response 184 received from the remote resource. As used herein, "access information" means information including at least one of credential validation information and permission information associated with at least one user credential. In some examples, network interface 110 may provide the identity information to module 124 as the access information. In other examples, network interface 110 may generate the access information based on identity information.

In some examples, determining module 126 may determine, based on at least the access information received by module 124, whether to provide access to a setting of the BIOS module in accordance with the access request received by module 122. The access information may include, for example, permission information indicating whether a user associated with the user credential has permission to access a setting in accordance with the access request. For example, the remote resource may determine whether the user has permission to access the setting, and provide an affirmative response if the user has permission, and a negative response otherwise. In such examples, this response may be included in or provided as the access information, and module 126 may determine whether to provide access based on whether the permission information included in the access information is affirmative or negative.

In other examples, the access information may include permission information that module 126 may compare to other information stored in BIOS module 120 to make its determination. For example, the permission information may identify entity groups of which a user identity associated with the user credential is a member. In such examples, module 126 may determine whether to provide access to the setting based on whether any of the entity groups identified in the permission information matches an entity group identified in a list of groups, stored in BIOS module 126, whose member have permission to access the setting.

In the example of FIG. 1, request 182 for identity information may be a request for at least one of validation information and permission information. For example, request 182 may be a request for permission information. In such examples, in response to receiving the access request, module 122 may request, from the remote resource, validation of a user credential. If, in response, module 122 receives an indication that the user credential is not valid, then module 122 may deny the access request. Alternatively, if module 122 receives a response from the remote resource indicating that the user credential is valid, then module 122 may provide, with network interface 110, a request 182 for identity information (i.e., permission information) to remote resource in response to both the access request and the indication that the user credential is valid. In such examples, network interface 110 may receive the requested permission information in response 184 and provide to module 124 access information based on the permission information.

In other examples, request 182 may be a request for both validation and permission information. In such examples, in response to receiving the access request, module 122 may request, from the remote resource via request 182, both validation of a user credential and BIOS setting permissions associated with the user credential. Network interface 110 may receive the requested validation and permission information via response 184 and provide the information to module 124 as the access information. In such examples, if module 126 determines that the access information indicates that the user credential is valid, then module 126 may determine, from the permission information, whether to provide access to a BIOS setting in response to the access request.

Additionally, in some examples, request 182 may be a request for validation information. In such examples, module 122 may request validation information for the user credential from the remote resource via request 182, in response to receiving the access request. In such examples, network interface 110 may receive the validation information in response 184 and provide the validation information to module 124 as the access information. Module 126 may then determine from the access information, and other information stored in BIOS module 120, whether to provide access to the BIOS setting in accordance with the access request.

Figure 2:
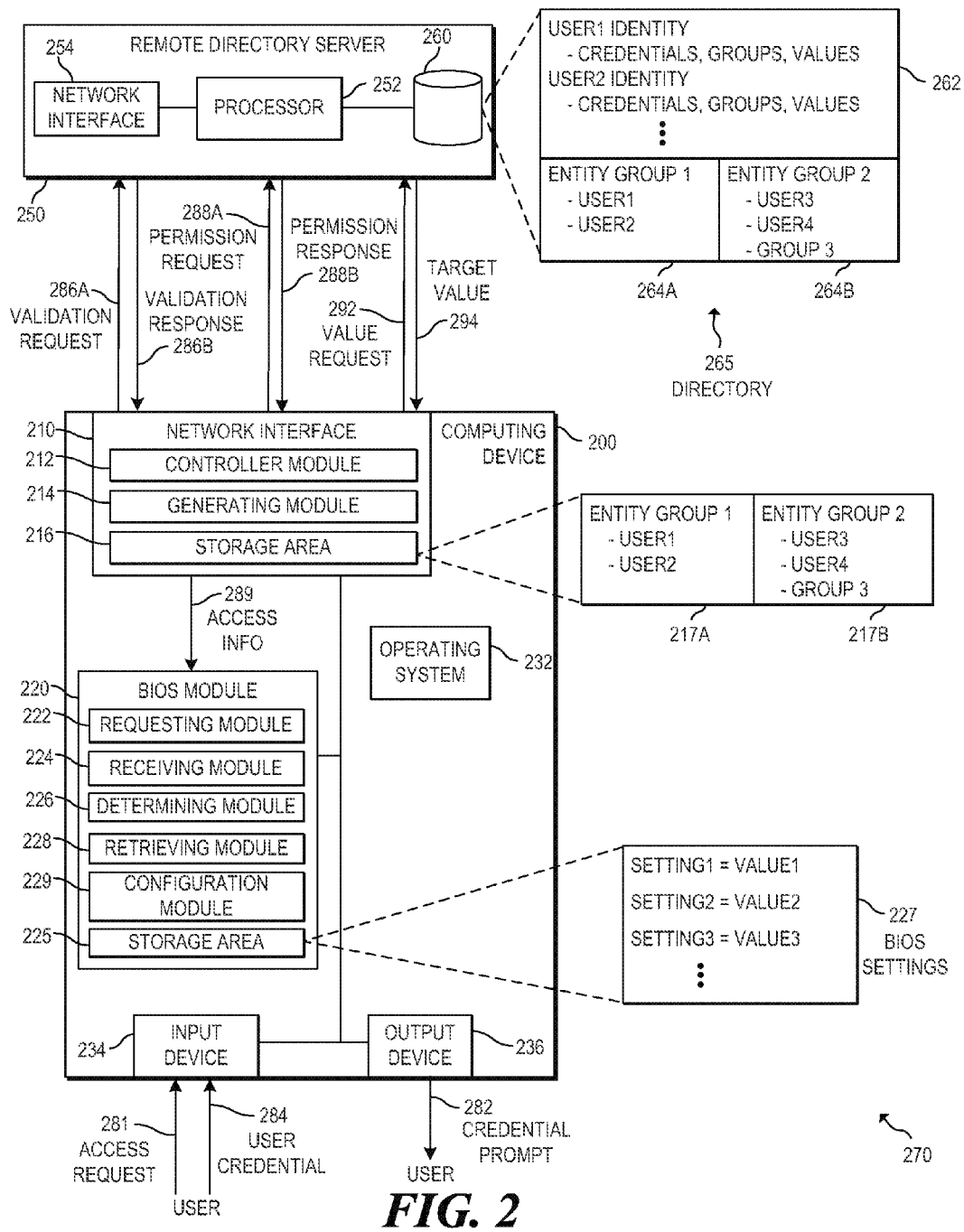
FIG. 2 is a block diagram of an example computing system for managing BIOS access using a remote directory server.

FIG. 2 is a block diagram of an example computing system 270 for managing BIOS access using a remote directory server. In the example of FIG. 2, computing system 270 includes a computing device 200 and a remote directory server 250. In some examples, computing device 200 includes a network interface 210, a BIOS module 220, an operating system 232, an input device 234, and an output device 236. BIOS module 220 includes modules 222, 224, 226, 228, and 229. BIOS module 220 also includes a storage area 225 where BIOS module 220 stores a plurality of BIOS settings 227. Storage area 225 includes a current value for each of the plurality of BIOS settings 227 of BIOS module 220. While FIG. 2 shows at least three BIOS settings 227 stored in storage area 225, in other examples more or fewer BIOS settings 227 may be stored in storage area 225.

Network interface 210 includes a controller module 212 and a generating module 214. In the example of FIG. 2, the functionality of modules 212 and 214 may be implemented as a series of instructions encoded on a machine-readable storage medium of computing device 200 and executable by a processor of computing device 200. In other examples, network interface 210 may comprise at least one hardware device including electronic circuitry for at least partially implementing the functionality of modules 212 and 214.

In some examples, operating system 232 may be any operating system capable of being booted by BIOS module 220 and run on computing device 200. In the example of FIG. 2, input device 234 may include, for example, at least one button, keyboard, keypad, touch screen, pointing device (e.g., mouse), accelerometer, microphone, or any other device capable of receiving input from a user of computing device 200. While the example of FIG. 2 includes only one input device 234, other examples may include a plurality of input devices 234. Output device 236 may include at least one device capable of communicating information to a user of computing device 200.

In the example of FIG. 2, remote directory server 250 may be a computing device implementing a network directory service. In some examples, the network directory service may be implemented a protocol such as, for example, the lightweight directory access protocol (LDAP), or any other suitable protocol. Additionally, remote directory server 250 may implement the network directory service using, for example, Microsoft® Active Directory®, or any other suitable directory service. In the example of FIG. 2, remote directory server 250 includes a processor 252, a network interface 254, and a storage area 260. As used herein, a "processor" may be at least one central processing unit (CPU), at least one semiconductor-based microprocessor, at least one graphics processing unit (GPU), at least one other hardware device suitable for the retrieval and execution of instructions stored on a machine-readable storage medium, or a combination thereof.

In some examples, the network directory service may store, in storage area 260, a directory 265 including a plurality of user identities 262 and a plurality of entity groups 264A and 264B. As used herein, a "storage area" may comprise a number of physical media for storing data, such as at least one hard disk, solid state drive, tape drive, and the like, or any combination thereof. Additionally, any storage area described herein may include a plurality of storage devices that, in combination, form a pool of available storage.

Each user identity 262 includes a plurality of parameters (e.g., attributes, etc.). In the example of FIG. 2, the parameters of each user identity 262 include at least one user credential associated with the user identity 262, a list of the entity groups of which the user identity 262 is a member, and a list of BIOS setting values associated with the user identity 262. In other examples, user identities 262 may include more or fewer parameters, and different user identities may include different numbers and types of parameters. Additionally, although two user identities are shown in FIG. 2, directory 265 may include more user identities 262. In the example of FIG. 2, each of entity groups 264A and 264B includes a list identifying each entity that is a member of that entity group. As used herein, an "entity" is a user identity or an entity group. In the example of FIG. 2, first and second user identities 262 are members of the first entity group 264A. Members of the second entity group 264B include third and fourth user identities 262, and a third entity group. Although two entity groups are shown in FIG. 2, directory 265 may include more entity groups.

In the example of FIG. 2, module 222 may receive a request to access a setting 227 of BIOS module 220. In some examples, module 222 may receive an access request 281 from a user of computing device 200 via input device 234. In such examples, a user may provide access request 281 to BIOS module 220 via input device 234 by providing a designated input (e.g., pressing a specific key on a keyboard) while the BIOS has control of computing device 200 before the BIOS has completed booting computing device 200. Entering the designated input in this manner may, for example, provide a request 281 to enter a process of the BIOS module through which a user of computing device 200 may alter at least one setting 227 of BIOS module 220. Such a request 281 to enter this BIOS process may be considered an "access request" herein.

In response to receiving access request 281 with module 222, retrieving module 228 may retrieve a user credential. In some examples, to retrieve the user credential, module 228 may display a credential prompt 282 to a user of computing device 200 via output device 236 (e.g., a monitor, screen, etc.). After displaying credential prompt 282, module 228 may receive a user credential 284 from a user of computing device 200 via at least one input device 234. For example, the user may input a username and password via input device 234 (e.g., a keyboard, etc.) as the user credential 284. In other examples, the user may use one or more input devices 234 to access and provide a digital credential (e.g., a digital certificate, key, etc.) to module 228 as the user credential 284. In other examples, module 228 may retrieve a user credential stored on computing device 200.

After module 228 retrieves the user credential, module 222 may request, with network interface 210, validation of the user credential from remote directory server 250. For example, module 222 may provide to server 250, with network interface 210, a validation request 286A including the retrieved user credential. Module 222 may receive, with network interface 210, a validation response 286B from server 250 after providing the validation request 286A. In some examples, in response to validation request 286A, server 250 may determine whether the user credential included in validation request 286A match the user credential of any of user identities 262 of directory 265. In some examples, server 250 may use the user credential to index user identities 262, such that server 250 may look up user identities 262 using a provided user credential. Additionally, in some examples, computing device 200 may use a network authentication protocol (e.g., Kerberos, or any other suitable protocol) to securely communicate with server 250.

If server 250 determines that the provided user credential (e.g., a username and password) matches the user credential of one of user identities 262, then server 250 may determine that the provided user credential is valid and return an affirmative validation response 286B. Otherwise, server 250 may determine that the provided user credential is not valid, and return a negative validation response 286B. In some examples, the validation request 286A and response 286B may be considered, respectively, an identity information request and response, as described above in relation to FIG. 1.

If validation response 286B is negative, determining module 226 may determine not to provide access to the BIOS setting 227 in response to the access request. If validation response 286B is affirmative, module 222 may request from server 250, with network interface 210, permission information for the user identity associated with the user credential. In such examples, module 222 may request permission information associated with the user credential in response to receiving access request 281 and receiving an indication (e.g., validation response 286B) that the user credential is valid. Module 222 may request the permission information by, for example, providing a permission request 288A to server 250 with network interface 210. Permission request 288A may include the validated user credential.

In response to permission request 288A, server 250 may determine, from directory 265, whether the user identity 262 associated with the validated user credential included in request 288A has permission to access a BIOS setting 227 in accordance with access request 281. In some examples, each entity group of directory 265 may include information indicating permissions of the members of the entity group. For example, first entity group 264A may indicate that its members have permission to enter a process of BIOS module 220 in which a user may alter one or more BIOS settings 227, while second entity group 264A indicates that its members do not. In such examples, server 250 may provide a response 288B including affirmative or negative permission information based on entity group memberships of a user identity 262 associated with the user credential.

After server 250 has determined the permissions for the user identity 262 associated with the user credential, server 250 may provide a permission response 288B, including permission information, to computing device 200. In some examples, the request 288A for permission information may be considered a request for identity information, and receiving response 288B, including permission information, may be considered receiving identity information. Network interface 210 may receive permission response 288B from server 250, and receiving module 224 may receive access information 289, based on the permission response 288B, from network interface 210. In such examples, network interface 210 may provide response 288B to receiving module 224 as access information 289.

In the example of FIG. 2, module 226 may determine to provide access to the BIOS setting 227 in accordance with access request 281 if access information 289 indicates that the user identity 262 associated with the user credential provided in permission request 288A has permission to access the BIOS setting 227. For example, module 226 may determine to permit the user to enter the process of BIOS module 220 in which a user may alter one or more BIOS settings 227 if response 288B includes affirmative permission information. Module 226 may determine not to permit entry to the process if response 288B includes negative permission information. In other examples, the permission information of response 288B may indicate a list of at least one BIOS setting 227 that a user identity 262 associated with the user credential has permission to access. In such examples, module 226 may determine from this information whether to provide the requested access.

In other examples, module 222 may request validation and permission information together (e.g., in a single communication), which may be considered a request for identity information. In response, server 250 may provide the validation response and permission response (e.g., identity information) to computing device 200 together in one response. In such examples, computing device 200 may receive no response if the user credential is not valid, and module 226 may determine not to provide the requested access if no response has been received after passage of a predetermined amount of time.

As described above in relation to FIG. 2, entity groups 264A and 264B may be stored in directory 265 of server 250. In other examples, entity groups 217A and 217B may be stored in a storage area 216 of network interface 210. In such examples, network interface 210 may determine whether a user identity 262 associated with a user credential has permission to access a BIOS setting 227 in accordance with access request 281. For example, network interface 210 may store, in storage area 216, first and second entity groups 217A and 217B, wherein each user identity included in first entity group 217A has permission to access BIOS settings 227 and each user identity included in second entity group 217B does not have permission to access BIOS settings 227. In such examples, network interface 210 may store the permissions associated with each entity group in storage area 216.

In such examples, if validation response 286B is negative, then generating module 214 may generate access information 289 indicating that the user credential is invalid and/or indicating to BIOS module 220 not to provide access in accordance with access request 281. If validation response 286B is affirmative, then network interface 210 may determine whether access should be granted based on the entity groups stored in storage area 216. Generating module 214 may generate access information 289 such that it indicates to BIOS module 220 whether or not to provide access to the BIOS setting 227 in accordance with access request 281. In such examples, module 226 may determine whether to provide access to the BIOS setting 227 based on access information 289 provided by network interface 210.

While the example of FIG. 2 includes two entity groups in storage area 216, in other examples, storage area 216 may store more than two entity groups, each with different permissions. Additionally, while entity groups 217A and 217B, and generating module 214 are shown in FIG. 2, in examples in which BIOS module requests permission information from server 250, entity groups 217A and 217B, and generating module 214 may be omitted from network interface 210.

In other examples, requesting module 222 may receive an access request that is a request for BIOS module 220 to request from server 250 a target value for a target setting 227 of BIOS module 220. In some examples, a configuration module 229 of BIOS module 220 may request this access, for example, as part of a boot process of computing device 200, in response to determining that another setting of BIOS module 200 indicates that a target value for the target setting 227 is to be retrieved from server 250, or in response to determining that the current value for the target setting 227 has expired. In other examples, this access request may be received from a remote resource via network interface 210.

In response to the access request, module 222 may provide a request 286A to validate a user credential retrieved by BIOS module 220 and receive validation response 286B. In such examples, validation request 286A may be considered a request for identity information and response 286B may be considered a response to the request for identity information. Module 226 may determine to provide the requested access if the response 286B is affirmative.

In such examples, module 224 may receive response 286B from network interface 210 as access information 289 and module 226 may determine to provide the requested access if access information 289 indicates that the user credential is valid. If module 226 determines to provide the requested access, then module 226 may request the target value from server 250 by providing a request 292 for the target value to server 250 with network interface 210. In some examples, request 292 may include the user credential and identify the target BIOS setting 227. In response, server 250 retrieve the target value for the target setting 227 stored in directory 265 for target user identity 262 and return the target value to computing device 200 in a communication 294. Module 226 may receive the target value from server 250 via network interface 210 and replace (e.g., overwrite) a current value of the target setting 227 in the BIOS module 220 with the received target value.

In some examples, before requesting or receiving validation or permission information, module 222 may attempt to authenticate server 250. For example, if computing device 200 is part of an enterprise, then module 222 may determine whether server 250 is a remote directory server for the enterprise by communicating with server 250 to determine whether directory 265 of server 250 has an organizational structure (e.g., schema) particular to the enterprise. If so, then computing device 200 may continue to communicate with server 250. If not, then computing device may cease communications with server 250.

In the example of FIG. 2, computing device 200 includes a communication controller module 212, which may manage network traffic between BIOS module 220 and operating system 232. In some examples, BIOS module 220 may perform functionalities described above in relation to FIG. 2 regardless of the state of operating system 232 on computing device 200. In such examples, BIOS module functionalities using network interface 210 may be invoked through an interrupt while operating system 232 is in a running state. In such examples, BIOS module 220 and operating system 232 communications using network interface 210 may be interleaved. In some examples, controller module 212 may manage use of network interface by BIOS module 220 and operating system 232. In such examples, controller module 212 may distinguish between communication requests made by BIOS module 220 and operating system 232 and appropriately route communications received by network interface 210 to either BIOS module 220 or operating system 232.

In some examples, communication controller module 212 may include a series of instructions encoded on a machine-readable storage medium of computing device 200 and executable by a processor to implement a virtualization layer between the BIOS module 220 and network interface 210, and between operating system 232 and network interface 210, to implement the functionalities described above. In some examples, communication controller module 212 may be included on network interface 210, as shown in FIG. 2. In such examples, the instructions implementing the virtualization layer may be executed by a processor of a management controller of network interface 210. In other examples, communication controller module 212 may be separate from network interface 210. In such examples, the instructions may be executed by a management controller separate from network interface 210 (e.g., a processor of a sideband management controller), or by a processor executing operating system 232.

In some examples, BIOS module 220 and network interface 210 may communicate with each other via a secure channel separate from other buses (e.g., a peripheral component interface (PCI) bus) of computing device 200. In some examples, the secure channel may be a physical line provided between the network interface 210 and an input/output controller hub (ICH) (e.g., a southbridge of computing device 200). In some examples, communications over this line may also be encrypted. In other examples, BIOS module 220 and network interface 210 may authenticate one another using a secure handshake procedure over the secure channel and subsequently communicate over the secure channel using unencrypted communications. Alternatively, rather than communicating via a secure channel, BIOS module 220 and network interface 210 may communicate by providing encrypted communications to one another over a bus of computing device 200 that is shared with other components of computing device 200.

Figure 3:
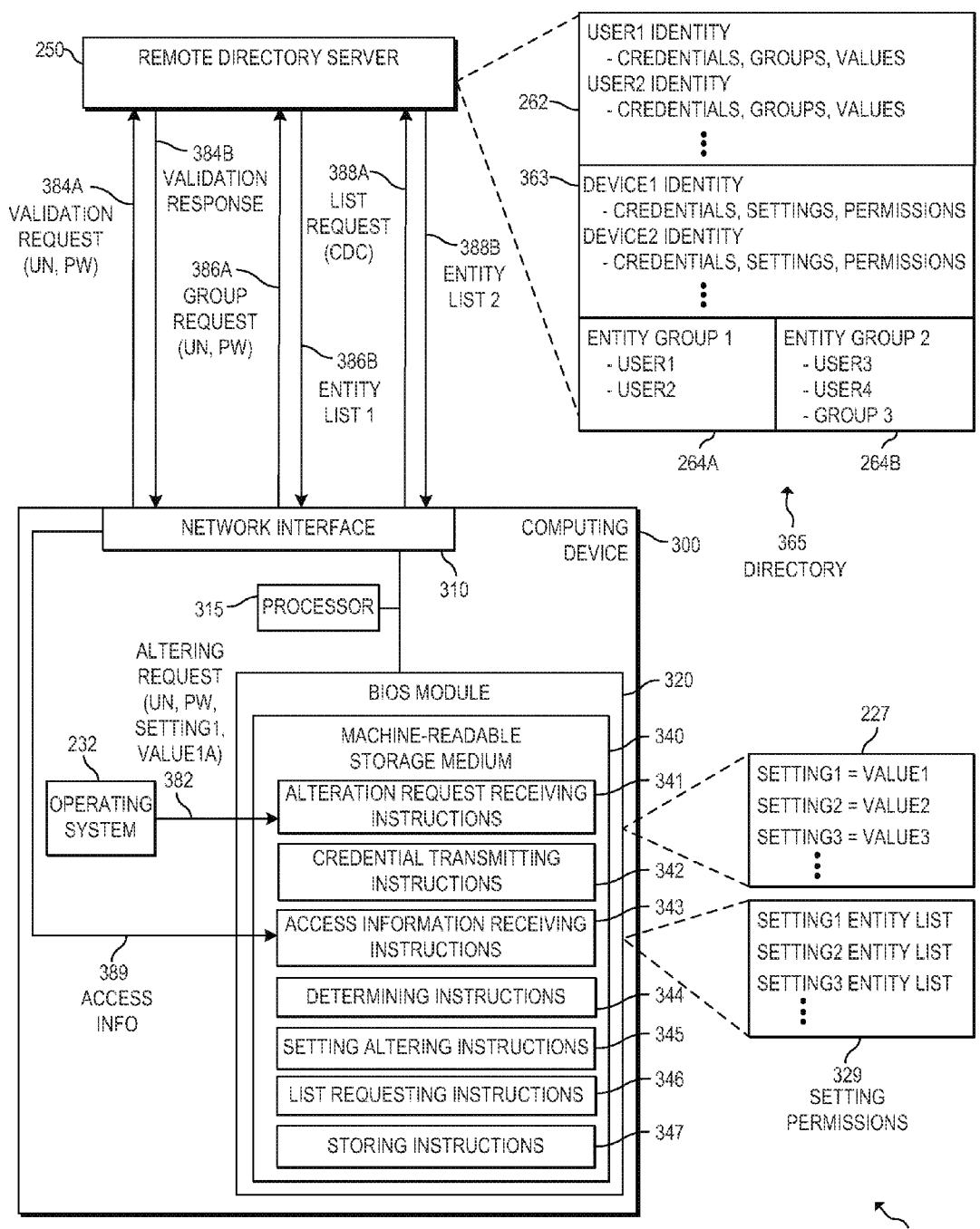
FIG. 3 is a block diagram of another example computing system for managing BIOS access using a remote directory server.

FIG. 3 is a block diagram of another example computing system 370 for managing BIOS access using a remote directory server 250. Computing system 370 includes a computing device 300 and a remote directory server 250. In the example of FIG. 3, server 250 is the same as server 250 described above in relation to FIG. 2, except that server 250 of the example of FIG. 3 stores a directory 365 instead of directory 265. In some examples, directory 365 may include a plurality of computing device identities 363, as shown in FIG. 3, in addition to the plurality of user identities 262 and the plurality of entity groups 264A and 264B. While FIG. 3 shows at least two computing device identities 363, in other examples directory 365 may include more or fewer computing device identities 363.

In the example of FIG. 3, computing device 300 includes a network interface 310, a processor 315, an operating system 232, and a BIOS module 320. BIOS module 320 includes a machine-readable storage medium 340, a plurality of BIOS settings 227 stored in a storage area of BIOS module 320, and a BIOS setting permissions list 329 stored in a storage area of BIOS module 320. In the example of FIG. 3, operating system 232 is the same as described above in relation to FIG. 2. Additionally, as used herein, a "machine-readable storage medium" may be any electronic, magnetic, optical, or other physical storage device that contains, stores, or is otherwise encoded with executable instructions. For example, any machine-readable storage medium described herein may be any of Random Access Memory (RAM), flash memory, a storage drive (e.g. a hard disk), a Compact Disc Read Only Memory (CD-ROM), and the like, or a combination thereof. Further, any machine-readable storage medium described herein may be non-transitory. In some examples, the plurality of BIOS settings 227 and the BIOS setting permissions list 329 may be stored in the same storage area, or in different storage areas. For example, the plurality of BIOS settings 227 and the BIOS setting permissions list 329 may be stored on machine-readable storage medium 340.

Machine-readable storage medium 340 includes instructions 341-347 for managing access to BIOS module 320. In the example of FIG. 3, processor 315 may fetch, decode, and execute the instructions of machine-readable storage medium 340 to implement the functionality described below. As an alternative or in addition to fetching, decoding, and executing instructions, processor 315 may include at least one integrated circuit (IC), at least one other electronic circuit, other control logic, or a combination thereof for performing some or all of the functionality of the instructions of machine-readable storage medium 340 described below.

In the example of FIG. 3, instructions 341 may receive a request 382 to alter at least one target BIOS setting 227. In some examples, the request 382 to alter the setting may include at least one user credential (e.g., a username (UN) and a password (PW)), information identifying the target setting (e.g., SETTING1), and a target value (e.g., VALUE1A) for the target setting. In some examples, request 382 may be received from operating system 232. For example, operating system 232 may include or run a series of instructions encoded on a machine-readable storage medium of computing device 300, and executable by a processor of computing device 300, for accessing (e.g., altering) BIOS settings 227. In such examples, the executable instructions may retrieve the user credential from a user as described above in relation to FIG. 1, or from a storage area of computing device 300. Additionally, in such examples, operating system 232 may provide an interrupt to an ICH, which may invoke the execution of instructions encoded on machine-readable storage medium 340 of BIOS module 320.

In response to at least receiving altering request 382 with instructions 341, instructions 342 may transmit the user credential from BIOS module 320 to server 250 with network interface 310. For example, instructions 342 may transmit a request 384A to validate the user credential received in altering request 382. Instructions 342 may receive a validation response 384B from server 250 with network interface 310, and determine to deny altering request 382 if validation response 384B is negative. If validation response 384B is affirmative, then, in response to BIOS module 320 receiving altering request 382 and the affirmative validation response 384B, instructions 342 may transmit a request 386A for group information to server 250 with network interface 310. The request 386A for group information may include the user credential. In such examples, group information may be considered permission information.

In such examples, request 386A may be a request for a list of the entity groups of directory 365 of which a target user identity 262 associated with the user credential is a member. In response, server 250 may return a first entity list 386B including information identifying all of the entity groups of which the target user identity 262 is a member.

In some examples, access information receiving instructions 343 may receive the first entity list 386B from network interface 310 as access information 389. Determining instructions 344 may determine whether access information 389 indicates that the target user identity 262 has permission to alter the target BIOS setting 227. In such examples, instructions 345 may alter the target setting in accordance with the request if instructions 344 determine that the access information 389 indicates at least that the target user identity 262 has permission to alter the target BIOS setting 227. For example, instructions 345 may alter the target setting by replacing (e.g., overwrite) the current value (e.g., VALUE1) of the target BIOS setting 227 with the target value (e.g., VALUE1A).

In the example of FIG. 3, BIOS module 320 includes a setting permissions list 329, which may indicate the entities (e.g., user identities and entity groups) that have permission to alter each of the plurality of BIOS settings 227. In some examples, permissions list 329 includes, for each BIOS setting 227, a list of entities having permission to alter that setting. In some examples, instructions 344 may compare the first entity list 386B to setting permissions list 329 to determine whether target user identity 262 has permission to alter the target BIOS setting 227. In such examples, instructions 344 may determine that access information 389 indicates that the target user identity 262 has permission to alter the target setting 227, if setting permissions list 329 indicates that at least one of the target user identity 262 and an entity group included in the first entity list 386B has permission to alter the target setting 227. In other examples, permissions list 329 may have a single entity list indicating the entities that have permission to alter all of BIOS settings 227.

In other examples, a setting permissions list 329 may not be stored in BIOS module 320 when network interface 310 receives first entity list 386B, or the setting permissions list 329 may not indicate which entities have permission to alter the target setting 227. In such examples, after BIOS module 320 receives the first entity list 386B, list requesting instructions 346 may request, from server 250 with network interface 310, a second entity list including information identifying at least one entity group whose members have permission to alter the target BIOS setting 227. For example, instructions 346 may provide a list request 388A to server 250 with network interface 310.

In some examples, each computing device identity 363 of directory 365 may include a plurality of parameters (e.g., attributes, etc.). In the example of FIG. 3, the parameters of each computing device identity 363 include at least one computing device credential associated with the computing device identity 363, a list of the plurality of BIOS settings 227 of the computing device associated with identity 363, and a list of permissions indicating which entities have permission to alter which BIOS settings 227 of the associated computing device.

In some examples, request 388A may include at least one computing device credential (CDC) stored on computing device 300. In some examples, server 250 may use the computing device credential to validate computing device 300 and as an index to access the associated computing device identity 363. Additionally, in some examples, request 388A may also include an identification of the target BIOS setting 227. In such examples, instructions 346 may receive from server 250, with network interface 310, a second entity list 388B including information identifying at least one user identity having permission and/or at least one entity group whose members have permission to alter the target BIOS setting 227.

After receiving the second entity list 388B, instructions 344 may determine the target user identity 262 has permission to alter the target BIOS setting 227 if the target user identity 262 or at least one of the entities included in first entity list 386B of access information 389 is identified in the second entity list 388B. In some examples, instructions 347 may store the second entity list 388B as or in a setting permissions list 329 of BIOS module 320.

In the example of FIG. 3, validation request 384A and group request 386A are provided separately to server 250 by computing device 300. In other examples, in response to receiving altering request 382 with instructions 341, instructions 342 may transmit the user credential received in altering request 382 as part of a request for identity information. In such examples, the request for identity information may be a request to validate the user credential and a request for group information for the target user identity associated with the user credential. In such examples, network interface 310 may receive the response of server 250 to the request, and provide the response to instructions 343 as access information 389. In some examples, instructions 343 may deny the altering request if the validation information is negative, and instructions 344 may determine whether to provide the requested access based in part on the provide the group information (e.g., first entity list 386B) if the validation information returned is affirmative.

Figure 4:
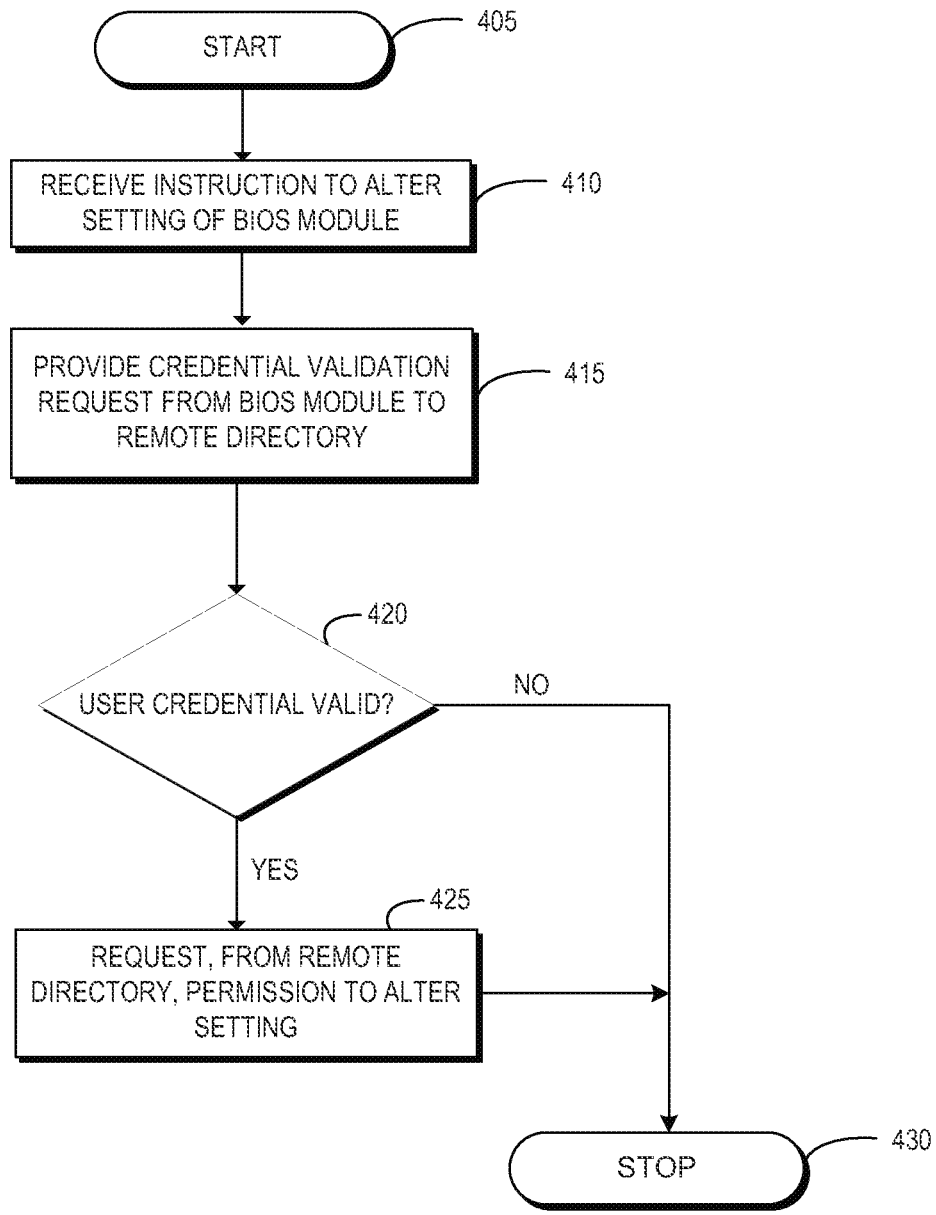
FIG. 4 is a flowchart of an example method for managing access to a BIOS module of a computing device.

FIG. 4 is a flowchart of an example method 400 for managing access to a BIOS module of a computing device. Although execution of method 400 is described below with reference to computing device 100 of FIG. 1, other suitable components for execution of method 400 can be utilized (e.g., computing device 200 or 300). Additionally, method 400 may be implemented in the form of executable instructions encoded on a machine-readable storage medium, in the form of electronic circuitry, or a combination thereof.

Method 400 may start at 405 and proceed to 410, where computing device 100 may receive, with the BIOS module 120 of computing device 100, an instruction to alter a first setting of BIOS module 120. In some examples, the BIOS module may receive the instruction from an operating system of computing device 100. After receiving the instruction to alter the setting, method 400 may proceed to 415, where computing device 100 may provide, from BIOS module 120 to a remote directory server, a request to validate a user credential in response to receiving the alteration instruction. In some examples, computing device 100 may provide the validation request to the remote directory server with network interface 110 of computing device 100.

After providing the validation request, method 400 may proceed to 420, where computing device 100 may determine whether a response to the validation request, received from the remote directory server, indicates that the user credential is valid. If, at 420, computing device 100 determines that the response to the validation request indicates that the user credential is not valid, than method 400 may proceed to 430, where method 400 may stop. However, if computing device 100 determines, at 420, that the response to the validation request indicates that the user credential is valid, then method 400 may proceed to 425. At 425, computing device 100 may provide, from BIOS module 120 to the remote directory server, a first request for permission to alter the first setting of the BIOS module. Method 400 may then proceed to 430, where method 400 may stop.

Figure 5:
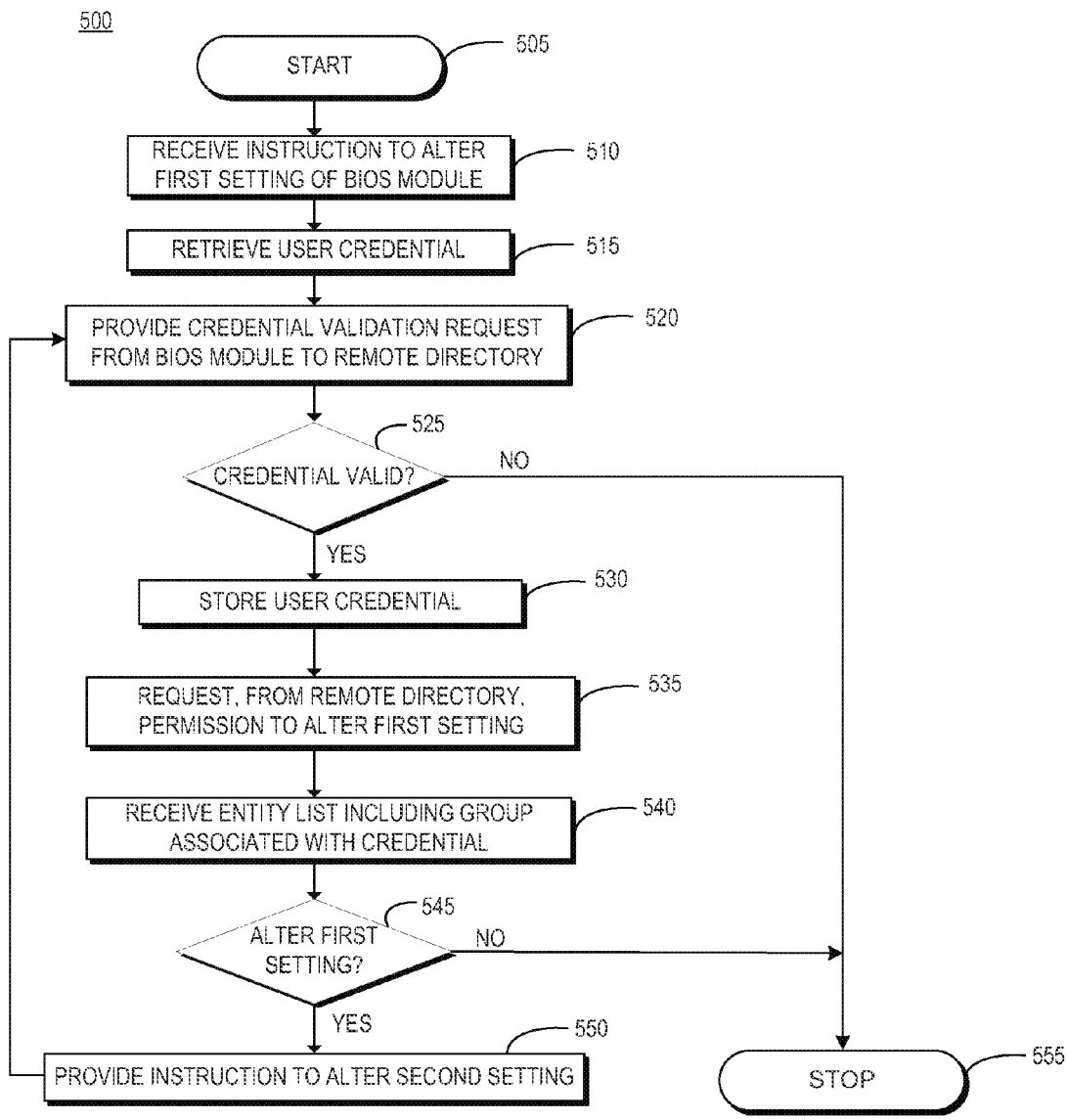
FIG. 5 is a flowchart of another example method for managing access to a BIOS module of a computing device.

FIG. 5 is a flowchart of another example method 500 for managing access to a BIOS module of a computing device. Although execution of method 500 is described below with reference to computing device 100 of FIG. 1, other suitable components for execution of method 500 can be utilized (e.g., computing device 200 or 300). Additionally, method 500 may be implemented in the form of executable instructions stored on a machine-readable storage medium, in the form of electronic circuitry, or a combination thereof.

Method 500 may start at 505 and proceed to 510, where computing device 100 may receive, with the BIOS module 120 of computing device 100, an instruction to alter a first setting of BIOS module 120. In some examples, the BIOS modules may receive the instruction from an operating system of computing device 100. After receiving the instruction to alter the setting, method 500 may proceed to 515 where computing device 100 may retrieve user credential in response to receiving the alteration instruction. In some examples, computing device 100 may retrieve the user credential from a user of computing device 100 using, for example, at least one output device and at least one input device. In other examples, computing device 100 may retrieve the user credential from a storage area of computing device 100.

After retrieving the user credential, method 500 may proceed to 520, where computing device 100 may provide, from BIOS module 120 to a remote directory server, a request to validate the user credential, in response to receiving the alteration instruction. In some examples, computing device 100 may provide the validation request to the remote directory server with network interface 110 of computing device 100.

After providing the validation request, method 500 may proceed to 525, where computing device 100 may determine whether a response to the validation request, received from the remote directory server, indicates that the user credential is valid. If computing device 100 determines that the response to the validation request indicates that the user credential is not valid, then method 500 may proceed to 555, where method 500 may stop. However, if computing device 100 determines that the response to the validation request indicates that the user credential is valid, then method 500 may proceed to 530.

At 530, method 500 may store the user credential in computing device 100. In such examples, the user credential may be stored in computing device 100 after determining that the user credential is valid. For example, computing device 100 may include an application (e.g., a set of machine-readable instructions executable by a processor of computing device 100) that may be run by an operating system of computing device 100 and allow a user of computing device 100 to request alterations to BIOS settings from within the operating system of computing device 100. In such examples, once BIOS module 120 has validated the user credential, the application may store the valid user credential such that they may be provided to BIOS module 120 with each alteration request from the user without the user entering the user credential again for every alteration request. In some examples, the user credential may be stored in computing device 100 until a current user logs out or computing device 100 is rebooted.

After storing the valid user credential, method 500 may proceed to 535, where computing device 100 may provide, from BIOS module 120 to the remote directory server, a request for permission to alter the first setting of the BIOS module. Method 500 may then proceed to 540, where computing device 100 may receive a response to the first permission request from the remote directory server. In some examples, the response to the first permission request may include an entity list including information identifying at least one entity group of which a target user identity is a member, wherein the target user identity is associated with the user credential. In other examples, the response may be affirmative or negative.

After receiving the response to the first permission request, method 500 may proceed to 545, where computing device 100 may determine whether to alter the first setting based at least in part on the response to the first permission request. In some examples, computing device 100 may compare the entity list returned in the response to a setting permissions list to determine, as described above in relation to FIG. 3, whether the target user identity has permission to alter the target setting. If computing device 100 determines that the target user identity has permission, then method 500 may proceed to 550. Alternatively, if computing device 100 determines that the target user identity does not have permission, then method 500 may proceed to 555, where method 500 may stop.

In other examples, in which the response received is affirmative or negative (and not an entity list), computing device 100 may determine to alter the first setting when the response is affirmative, and proceed to 550. In such examples, computing device 100 may determine not to alter the first setting when the response is negative, and proceed to 555, where method 500 may stop.

After storing the user credential at 530, computing device 100 may, at 550, provide to BIOS module 120 an instruction to alter a second setting of BIOS module 120, wherein the instructions includes the stored user credential. For example, an application run by the operating system of computing device 100 may, at 550, retrieve the stored user credential and provide it to BIOS module 120 as part of an instruction to alter the second setting. Method 500 may then proceed to 520, described above in relation to FIG. 5.

What is claimed is:

1. A computing device for managing basic input/output system (BIOS) access, the computing device comprising:
   a network interface; and
   a BIOS module to:
     request, from a remote directory server with the network interface, identity information associated with a user credential in response to receiving a request to access a setting of the BIOS module;
     receive access information based on a response of the remote directory server to the request for identity information; and
     determine, based on the access information whether to provide access to the setting,
     wherein the network interface is to provide the access information based on validation information and permission information from the response of the remote directory server.

2. The computing device of claim 1, wherein the BIOS module is further to:
   retrieve a user credential in response to receiving the request to access a setting of the BIOS module;
   request, from the remote directory server with the network interface, validation of the user credential; and
   request, from the remote directory server with the network interface, identity information associated with the user credential in response to receiving the request to access the setting of the BIOS module and receiving an indication that the user credential is valid.

3. The computing device of claim 2, wherein the BIOS module is further to:
   determine to provide access to the setting in accordance with the access request, if the access information indicates that a user identity associated with the user credential has permission to access the setting.

4. The computing device of claim 3, wherein the network interface is to:
   receive the response of the remote directory server to the request for identity information; and
   provide the response to the BIOS module as the access information.

5. The computing device of claim 4, wherein the network interface is to:
   store first and second entity groups, wherein each user identity included in the first entity group has permission to access the setting and each user identity included in the second entity group does not have permission to access the setting;
   receive, from the remote directory server, the response to the request for identity information;
   generate the access information such that the access information indicates to the BIOS module to provide access to the setting, if the user identity is included in the first entity group and the response indicates that the user credential is valid; and
   provide the access information to the BIOS module.

6. The computing device of claim 1, further comprising:
   a communication controller module to manage use of the network interface by the BIOS module and an operating system of the computing device.

7. The computing device of claim 1, the BIOS module further to:
   request, from the remote directory server, a target value of the setting for a target user identity associated with the user credential, if the access information indicates that the user credential is valid; and
   replace a current value of the setting in the BIOS module with the target value received from the remote directory server.

8. The computing device of claim 1, wherein the BIOS module is further to
   request, from the remote directory server with the network interface, a target value for the setting in response to:
     a boot process operation of the computing device;
     a determination that another setting indicates that the target value for the setting is to be retrieved from the remote directory server; or
     a determination that a current value for the setting is expired.

9. The computing device of claim 1, further comprising:
   a machine-readable storage medium having instructions stored thereon that when executed cause a processor to implement a virtualization layer between the network interface and the BIOS module and between the network interface and an operating system.

10. The computing device of claim 9, wherein the network interface is further to:
    distinguish between communication requests made by the BIOS module and the operating system; and
    route responses received by the network interface to the BIOS module or the operating system.

11. The computing device of claim 1, wherein:
the BIOS module is further to store a plurality of BIOS settings and a BIOS setting permissions lists; and
the network interface is further to:
  receive a plurality of user identities, a plurality of entity groups, and a plurality of computing device identities; and
  generate the access information based on a comparison of the BIOS setting permissions list to the plurality of user identities, the plurality of entity groups, and the plurality of computing device identities.

12. A non-transitory machine-readable storage medium of a basic input/output system (BIOS) module, encoded with instructions executable by a processor of a computing device to manage access to the BIOS module, the storage medium comprising:
  instructions to receive a request to alter a setting of the BIOS module;
  instructions to transmit a user credential from the BIOS module to a remote directory server with a network interface of the computing device, in response to receiving the request;
  instructions to receive access information, from the network interface, based on a response of the remote directory server to the transmission of the user credential, the response to include validation information and permission information; and
  instructions to alter the setting in accordance with the request, if the access information indicates that a target user identity associated with the user credential has permission to alter the setting.

13. The machine-readable storage medium of claim 12, wherein the request to alter the setting of the BIOS module includes the user credential.

14. The machine-readable storage medium of claim 12, wherein the access information comprises a first entity list including information identifying at least one entity group of which the target user identity is a member, the storage medium further comprising:
  instructions to determine that the access information indicates that the target user identity has permission to alter the setting, if a setting permissions list of the BIOS module indicates that the target user identity or an first entity group included in the first identity list has permission to alter the setting.

15. The machine-readable storage medium of claim 14, further comprising:
  instructions to request, from the remote directory server, a second entity list including information identifying a second entity group whose members have permission to alter the setting; and
  instructions to store the second entity list in the setting permissions in the BIOS module.

16. A method for managing access to a basic input/output system (BIOS) module of a computing device, the method comprising:
  receiving, with the BIOS module, an instruction to alter a first setting of the BIOS module;
  providing, from the BIOS module to a remote directory server, a request to validate a user credential in response to receiving the alteration instruction;
  providing, from the BIOS module to the remote directory server, a first permission request for permission to alter the first setting of the BIOS module, if a response to the validation request, received from the remote directory server, indicates that the user credential is valid;
  receiving, with the computing device, a response to the first permission request including an entity list associated with the user credential; and
  causing the first setting to be altered based on a comparison of the entity list to a setting permissions list, the setting permissions list to indicate entities that have permission to alter the first setting.

17. The method of claim 16, further comprising:
retrieving the user credential in response to receiving the alteration instruction; and
storing, on the computing device, the user credential if the response to the validation request indicates that the user credential is valid.

18. The method of claim 17, wherein the response to the first permission request includes an entity list including information identifying an entity group of which a target user identity is a member, wherein the target user identity is associated with the user credential.

19. The method of claim 17, further comprising:
  storing, on the computing device, a first entity group and a second entity group, wherein each user identify included in the first entity group has permission to access the first setting and each user identity included in the second entity group does not have permission to access the first setting; and
  providing to the BIO module an instruction to alter a second setting of the BIOS module, after storing the user credential, wherein the instruction includes the stored user credential.

20. The method of claim 16, wherein:
the providing the request to validate a user credential comprises:
  providing a computing device credential; and
the providing the first permission request occurs if the response to the validation request indicates that the user credential is valid and that the computing device is valid.

* * * * *

UNITED STATES PATENT AND TRADEMARK OFFICE
CERTIFICATE OF CORRECTION

PATENT NO. : 9,519,784 B2  
APPLICATION NO. : 14/347530  
DATED : December 13, 2016  
INVENTOR(S) : Christoph J. Graham Page 1 of 1

It is certified that error appears in the above-identified patent and that said Letters Patent is hereby corrected as shown below:

In the Claims

In Column 15, Line 51, in Claim 1, delete "information" and insert -- information, --, therefor.

In Column 16, Line 45, in Claim 8, delete "to" and insert -- to: --, therefor.

In Column 17, Line 12, in Claim 12, delete "medium" and insert -- medium, --, therefor.

In Column 17, Line 53, in Claim 15, delete "permissions" and insert -- permissions list --, therefor.

In Column 18, Line 41 approx., in Claim 19, delete "BIO" and insert -- BIOS --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*